United States Patent [19]

Fornasari

[11] 4,023,708

[45] May 17, 1977

[54] SAFETY DEVICE FOR WATER SUPPLY LINE OF A WASHING MACHINE

[75] Inventor: Paolo Fornasari, Casale Monferrato (Alessandria), Italy

[73] Assignee: Libero Elettrotecnica, Casale Monferrato (Alessandria), Italy

[22] Filed: Sept. 16, 1976

[21] Appl. No.: 723,823

[30] Foreign Application Priority Data

Feb. 27, 1976 Italy .................................. 67472/76

[52] U.S. Cl. ............................................... 222/20
[51] Int. Cl.$^2$ ..................................... B67D 5/30
[58] Field of Search ............................... 222/20, 14

[56] References Cited

UNITED STATES PATENTS 3,097,762  7/1963  Charnota et al. .................... 222/20
3,497,106  2/1970  Clarke ................................ 222/20

Primary Examiner—Stanely H. Tollberg
Assistant Examiner—Hadd Lane
Attorney, Agent, or Firm—Alan H. Levine

[57] ABSTRACT

A safety device including a valve comprising a valve disk mounted on a rotatable shaft and movable axially toward and away from a valve seat. The shaft is rotatable by means of a geared transmission driven by a turbine wheel which is rotated by water flowing through the device. The pressure of water flowing through the device urges the valve disk toward the valve seat, but the disk and seat do not engage until the disk has rotated through a predetermined angle corresponding to a predetermined volume of water flow through the device.

7 Claims, 3 Drawing Figures

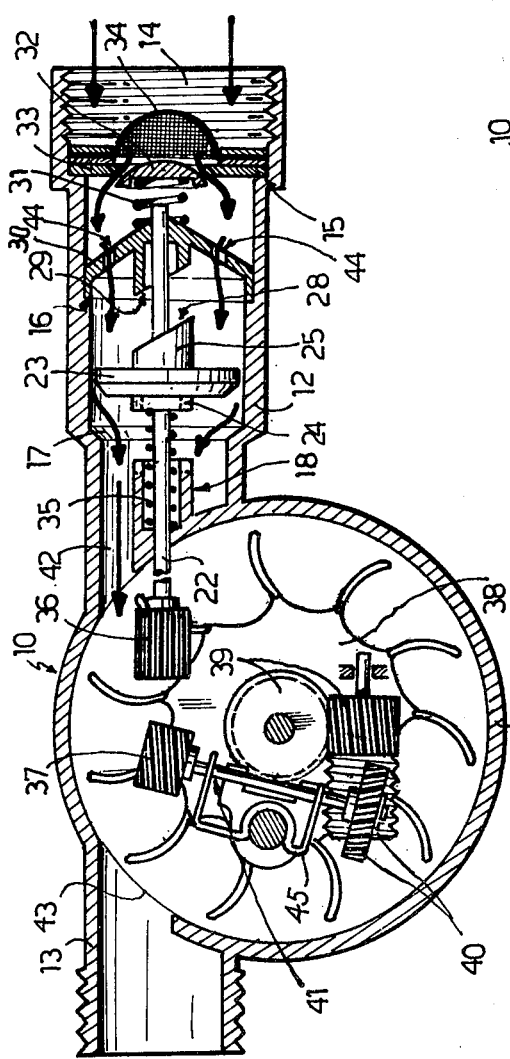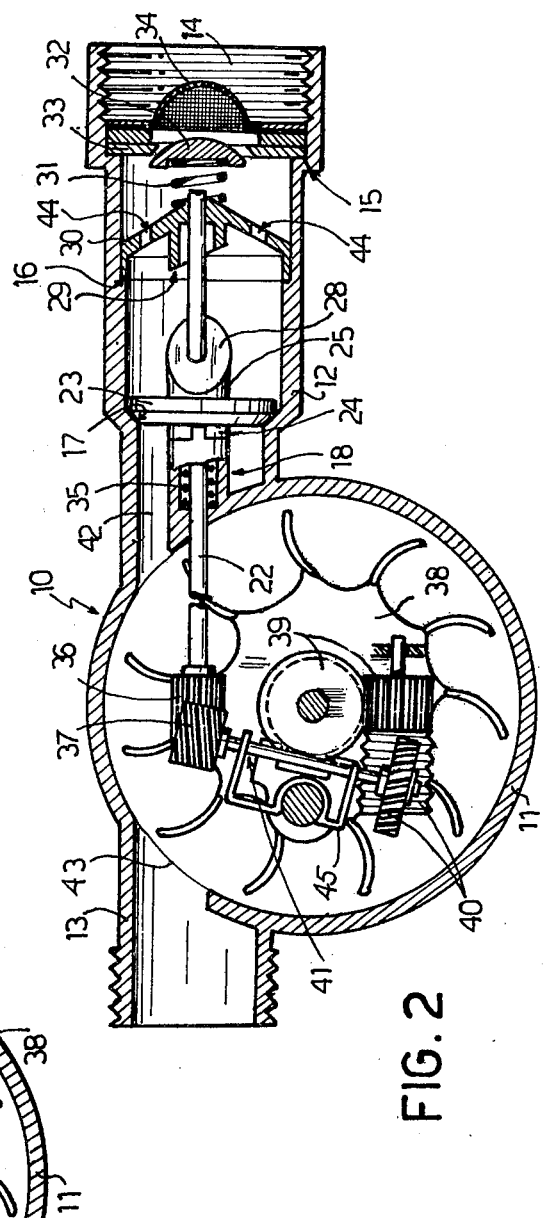
FIG. 1
FIG. 2

SAFETY DEVICE FOR WATER SUPPLY LINE OF A WASHING MACHINE

The present invention relates to improvements is a safety device for controlling flow through the water supply line to a washing machine.

The main object of the invention is to provide a safety device which may be supplied downstream of the water source which supplies the machine, i.e., upstream of the pipe section connecting the machine to the corresponding source, calibrated to pass only a predetermined water volume flowing from the source. When the predetermined water volume has flowed through the device, a mechanism intercepts flow from the source and prevents the water flow from continuing to the machine and causing floods and consequent damages, if any failure has occurred.

Certain devices are known which may be connected to the supply source and the water feeding pipe in order to prevent floods if the solenoid valve malfunctions. Such devices are of complicated structure and are generally provided with a hand operated control.

Another object of present invention is to provide a completely automatic safety device which may be easily manufactured and calibrated.

A further object of the invention is to provide a safety device provided with a check valve for preventing the possible backflow of water containing dissolved cleansing agents into the water supply pipe, if there is a depression in the pipe.

Another object of present invention is to provide a device having an integral casing by the use of a helical spring for returning and resetting the rotating valve disk of the device.

The particular features and advantages of the device according to the invention will be seen from the detailed following specification in which reference is made to the accompanying drawings, which are given only as a non-limiting example of the invention, and wherein:

FIG. 1 is an axial cross-section of the device illustrating an intermediate position of the rotating valve disk in the initial phase of operation of the device;

FIG. 2 is a cross-section, similar to the preceding view, but illustrating the rotating valve disk in the closed position.

Figure 3:
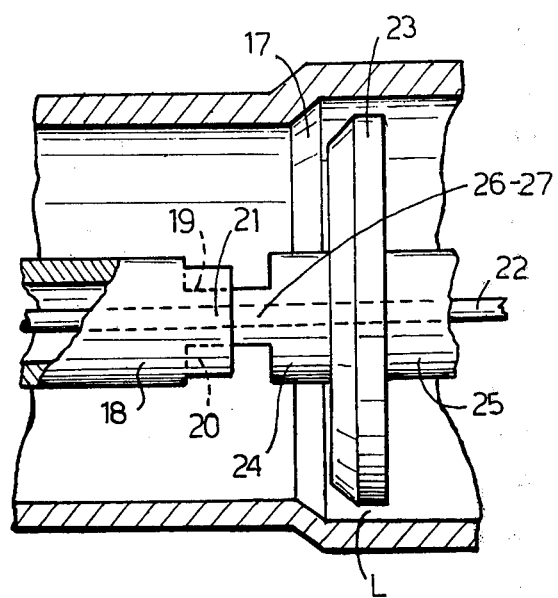
FIG. 3 is an enlarged detail illustrating the hub portion located in front of the rotating valve disk.

In the drawings, the body 10 of the device comprises a cylindrical central casing 11, intended to contain the rotating valve disk actuating mechanism, and two pipe fittings 12 and 13 serving as an inlet and an outlet, respectively, integrally formed together with casing 11, as by diecasting.

The pipe fitting 12 is formed with an inner screw thread 14, for connection to a water supply pipe, first and second shoulders 15 and 16, and a conical valve seat 17. A location appendage 18 is formed coaxial with the pipe fitting ad integrally with the wall defining the casing 11. Appendage 18 is provided with two diametrically opposite frontal notches 19 and 20 which are separated by a nib 21. The appendage, which is internally hollow, contains a small slidable control shaft 22 on to which a valve disk 23 is fitted; the disk is capable of engaging the conical valve seat 17; its diameter is smaller than the inner diameter of the pipe fitting 12 so that an annular passage L is defined between the disk and the inner wall of the pipe fitting.

The disk 23 is formed by a small plate having a first hub portion 24 in front of it and a second hub portion 25 behind it. The first portion 24 presents a pair of frontal teeth 26 and 27 (or at least one frontal tooth) intended to engage, in a preestablished angular position of the plate, the corresponding notches 19 and 20 of the location appendage 18. The second hub portion 25 has a slanting plane surface 28 suitable for cooperation with the corresponding surface 29, having a complimentary inclination, of a cap 30 seated against the shoulder 16 of the pipe fitting 12. Cap 30 is provided with an axial hole which guides the small shaft 22 and serves also as a bearing for a spring 31 acting on the shutter 32 of a check valve. Shutter 32 is engageable with a valve seat formed in a diaphragm 33 locked against shoulder 15 of the pipe fitting 12. A filter 34 is preferably located upstream of said check valve.

A helical spring 35 contained within appendage 18, acts on the valve disk 23 and normally keeps it out of engagement with the valve seat 17, and slanting surface 28 in engagement with surface 29. This configuration corresponds to a predetermined angular position of the valve disk 23. This position is characterized by teeth 26 and 27 of the hub portion 24 being angularly displaced with respect to the corresponding notches 19 and 20 of the location appendage 18. This happens because the teeth and the slanting surface 28 are angularly displaced with respect to the notches by the same angle, which in the illustrated example is an angle of 90°.

Thus, when the valve disk 23 is axially pushed against the action of spring 35, as will be better described below, teeth 26 and 27 first come in contact with nib 21. The engagement between the teeth and the corresponding notches 19 and 20 of appendage 18 may only occur if the disk 23 is rotated through an angle equal to the angular displacement which has been defined above.

The axial thickness of the teeth and the depth of the notches are selected so that when the teeth and notches are engaged, the valve disk 23 is in contact with the valve seat 17 to close the valve.

At one end of the small shaft 22, a gear wheel 36 is fitted which meshes with a gear 37, of the actuating mechanical device, when the valve disk is pushed into engagement with the valve seat. The actuating mechanism comprises a small turbine wheel 38 contained in the casing 11. Turbine, wheel 38 rotates a small shaft 41, carrying gear 37, by means of first and second pairs of gears 39 and 40, respectively, each pair comprising a worm screw and a worm wheel. The small shaft 41 is resiliently supported by bracket 45 in order to avoid damage to the gear teeth. A passageway is formed at 42, on one side of appendage 18 in the pipe fitting 12, to supply pressurized water to the turbine wheel 38, and the pipe fitting 13 drains the water leaving the turbine, which flows out through a discharge port 43. The cap 30 is provided with holes 44 so that water is supplied at a predetermined rate to the turbine wheel 38, as illustrated by the arrows in FIG. 1.

The operation of the device is as follows: the pressurized water, flowing through the water supply pipe, acts on the check valve and moves shutter 32 to its open position to permit flow through holes 44 to pipe fitting 12. Within the pipe fitting, the water acts on the valve disk 23 by displacing it axially against the action of spring 35 until teeth 26 and 27 engage nib 21 of appendage 18. Valve disk 23 has, at this point, not yet reached seat 17.

At the same time, through the annular passage L, the water flows through passageway 42 and rotates the turbine wheel 38 which, through gears 39 and 40 and 36 and 37 (the latter being in mesh), very slowly rotates the small shaft 22 and the disk 23 which is fixed on it. When the disk 23 rotates through an angle equal to the angular displacement initially existing between teeth 26 and 27 and notches 19 and 20, the teeth and the notches engage one another, thus allowing a further axial displacement of the disk 23. The latter will then engage the valve seat 17, thus intercepting the water flow to the turbine wheel 38 which will therefore stop rotating. This closed condition will exist as long as the pressure of the water upstream of the disk 23 remains.

When the pressure ceases, e.g., because the water flow is intercepted upstream of the pipe fitting 13 by the machine solenoid valve, the shutter 32 of the check valve will again engage its valve seat to prevent a possible return flow, and the rotating disk 23 will be pushed by spring 35 against the cap 30. Under the action of spring 35, the two surfaces 28 and 29 now relatively angularly displaced will engage one another and therefore produce a reverse rotation of disk 23 which will be returned to its initial angular position.

The same occurs if the water pressure within the pipe fitting 12 drops before the completion of rotation of the disk 23, which brings the disk into engagement with the valve seat 17. Consequently, the device does not close if the maximum delivery for which it has been calibrated is not reached. The calibrated maximum delivery is higher than the filling delivery programmed by the machine cycle; hence, the device operates to bring disk 23 against seat 17 during each machine cycle, thus assuring the greatest control reliability.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A safety device to regulate the volume of water flow to a washing machine, comprising a valve which is normally open, characterized in that said valve comprises a rotating disk firmly fitted to a small control shaft which is axially slidable against the action of a helical spring and formed by a plate with a first and a second hub portion in front of and behind the plate, respectively, in that the first hub portion is provided with at least one frontal tooth intended to engage, for a pre-established angular position of the plate, the corresponding notch of a location appendage which is integrally formed with the device body, and the second hub portion presents an adjustment surface suitable to cooperate with the corresponding surface of a fixed stop cap when the small shaft and the shutter are pushed to the rest position by the action of said helical spring; and that the tooth and the adjustment surface are angularly displaced with respect to the notch of the location appendage of the same angle.

2. A safety device according to claim 1, wherein the first hub portion is provided with two teeth diametrally opposite and the location appendage is provided with two notches, also diametrally opposite, and separated by a nib, and wherein the angular displacement between the teeth and the notches in the initial angular position of the disk is such as to bring said teeth into engagement with said nib.

3. A safety device as claimed in claim 1, characterized in that the fixed cap cooperates with a spring which acts on the shutter of a check valve located at the input section of the device and actuated by the water flow pressure coming from the distribution pipe.

4. A safety device as claimed in claim 3, wherein the seat of said check valve is formed in an inserted diaphragm and is protected by a filter.

5. A safety device as claimed in claim 1, wherein the small control shaft carries a gear wheel at its end which is brought into engagement with a gear wheel of the actuating mechanism when the teeth engage the nib of the location appendage.

6. A safety device as claimed in claim 5, wherein the actuating mechanism comprises a small turbine wheel and two transmission groups, each formed by a worm screw and a worm wheel, which move a small shaft carrying a gear wheel fitted at its end and intended to engage with said end gear wheel.

7. A safety device as claimed in claim 1, characterized in that it comprises a body formed in a single piece and including a casing to contain the actuating mechanism, an inlet pipe fitting and an outlet pipe fitting, the inlet pipe fitting carrying a conical valve seat, a first shoulder to axially retain the diaphragm forming the seat of the check valve, and a second shoulder to axially retain the fixed cap.

* * * * *